(12) United States Patent
Qian

(10) Patent No.: US 11,402,730 B2
(45) Date of Patent: Aug. 2, 2022

(54) CAMERA MOBILE DEVICE HOLDER WITH STABLIZATION

(71) Applicant: HANGZHOU TARO POSITIONING TECHNOLOGY CO., LTD., Hangzhou (CN)

(72) Inventor: Hao Qian, Hangzhou (CN)

(73) Assignee: HANGZHOU TARO POSITIONING TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 17/254,068

(22) PCT Filed: Jun. 19, 2018

(86) PCT No.: PCT/CN2018/091839
§ 371 (c)(1),
(2) Date: Dec. 18, 2020

(87) PCT Pub. No.: WO2019/241909
PCT Pub. Date: Dec. 26, 2019

(65) Prior Publication Data
US 2021/0263395 A1 Aug. 26, 2021

(51) Int. Cl.
*G03B 17/56* (2021.01)
*F16M 11/18* (2006.01)
*H04N 5/232* (2006.01)

(52) U.S. Cl.
CPC .......... *G03B 17/563* (2013.01); *F16M 11/18* (2013.01); *G03B 17/561* (2013.01); *H04N 5/23206* (2013.01)

(58) Field of Classification Search
CPC ..... G03B 17/563; G03B 17/561; F16M 11/18
See application file for complete search history.

(56) References Cited

U.S. PATENT DOCUMENTS 3,825,748 A * 7/1974 Van Wandelen ..... G03B 17/561
250/221
11,122,210 B2 * 9/2021 Qian ...................... F16M 13/04
(Continued)

FOREIGN PATENT DOCUMENTS

CN 1701213 A 11/2005
CN 102563321 A 7/2012
(Continued)

OTHER PUBLICATIONS

International Search Report issued in International Application No. PCT/CN2018/091839 dated Mar. 25, 2019 (3 pages).
(Continued)

*Primary Examiner* — Clayton E. LaBalle
*Assistant Examiner* — Diana Hancock
(74) *Attorney, Agent, or Firm* — Osha Bergman Watanabe & Burton LLP

(57) ABSTRACT

A method to stabilize a camera device. The method includes receiving, from the camera device mounted in a camera device holder, sensor data representing at least one selected from a group consisting of orientation and movement of the camera device, generating, using a pre-determined algorithm, a control signal based on the sensor data, and adjusting, using the control signal, a geometrical behavior of the camera device holder, wherein the geometrical behavior corresponds to at least one selected from a group consisting of the orientation and the movement of the camera device holder.

14 Claims, 12 Drawing Sheets

(56) References Cited

U.S. PATENT DOCUMENTS

| | | | |
|---|---|---|---|
| 11,190,701 B2* | 11/2021 | Qian | F16M 11/18 |
| 2015/0241713 A1* | 8/2015 | Laroia | H04N 5/23245 |
| | | | 348/208.2 |
| 2017/0026568 A1* | 1/2017 | Haehnichen | G06F 3/167 |
| 2017/0175948 A1* | 6/2017 | Zeise | F16M 11/126 |
| 2017/0331999 A1* | 11/2017 | Kang | H04N 5/23293 |
| 2019/0108412 A1* | 4/2019 | Wang | H04N 5/23299 |
| 2019/0219224 A1* | 7/2019 | Kang | F16M 11/205 |
| 2020/0050087 A1* | 2/2020 | Su | F16M 13/022 |
| 2021/0263395 A1* | 8/2021 | Qian | F16M 11/18 |

FOREIGN PATENT DOCUMENTS

| | | |
|---|---|---|
| CN | 103685927 A | 3/2014 |
| CN | 104049441 A | 9/2014 |

OTHER PUBLICATIONS

Written Opinion issued in International Application No. PCT/CN2018/091839 dated Mar. 25, 2019 (4 pages).

* cited by examiner

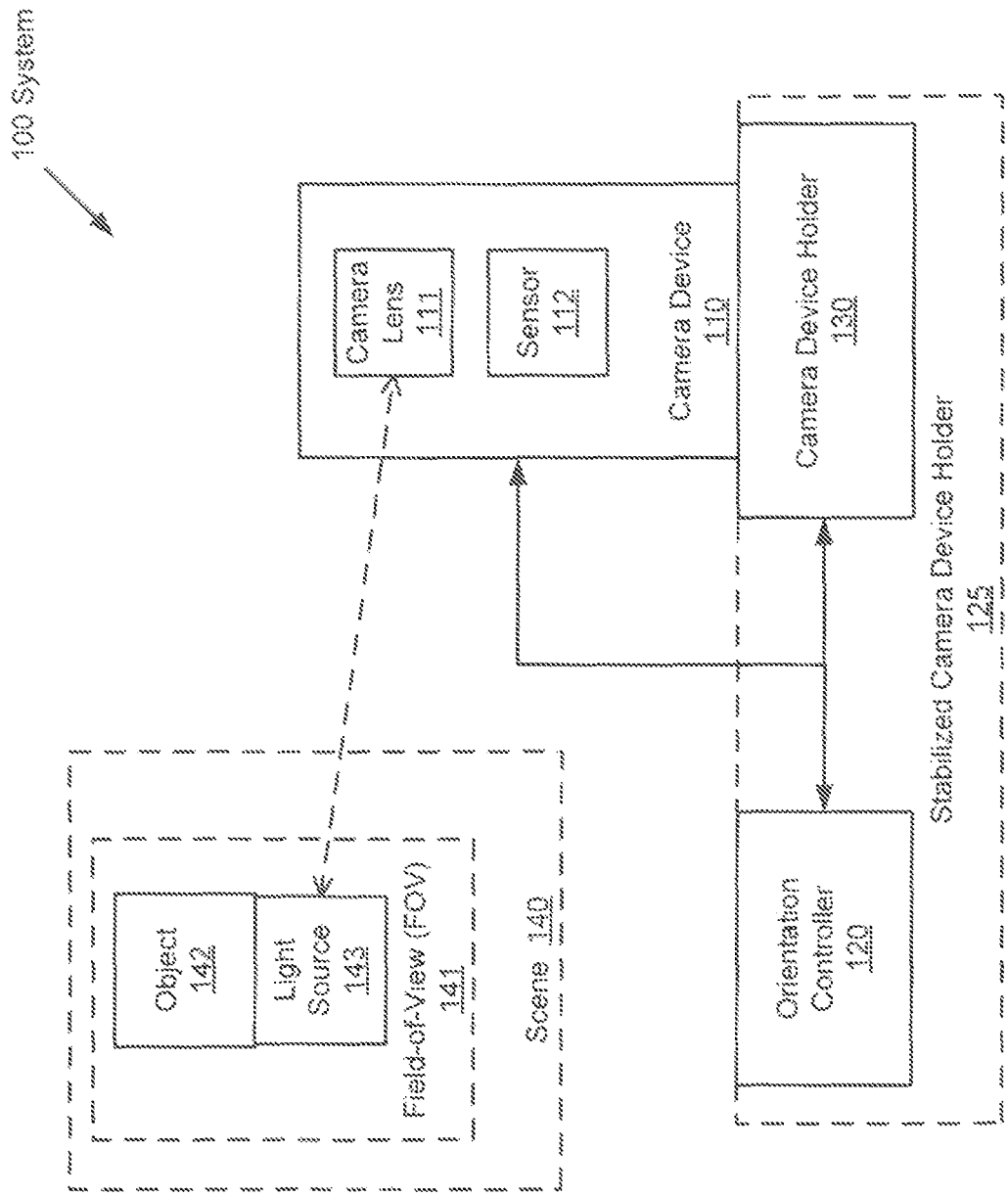
FIG. 1.1

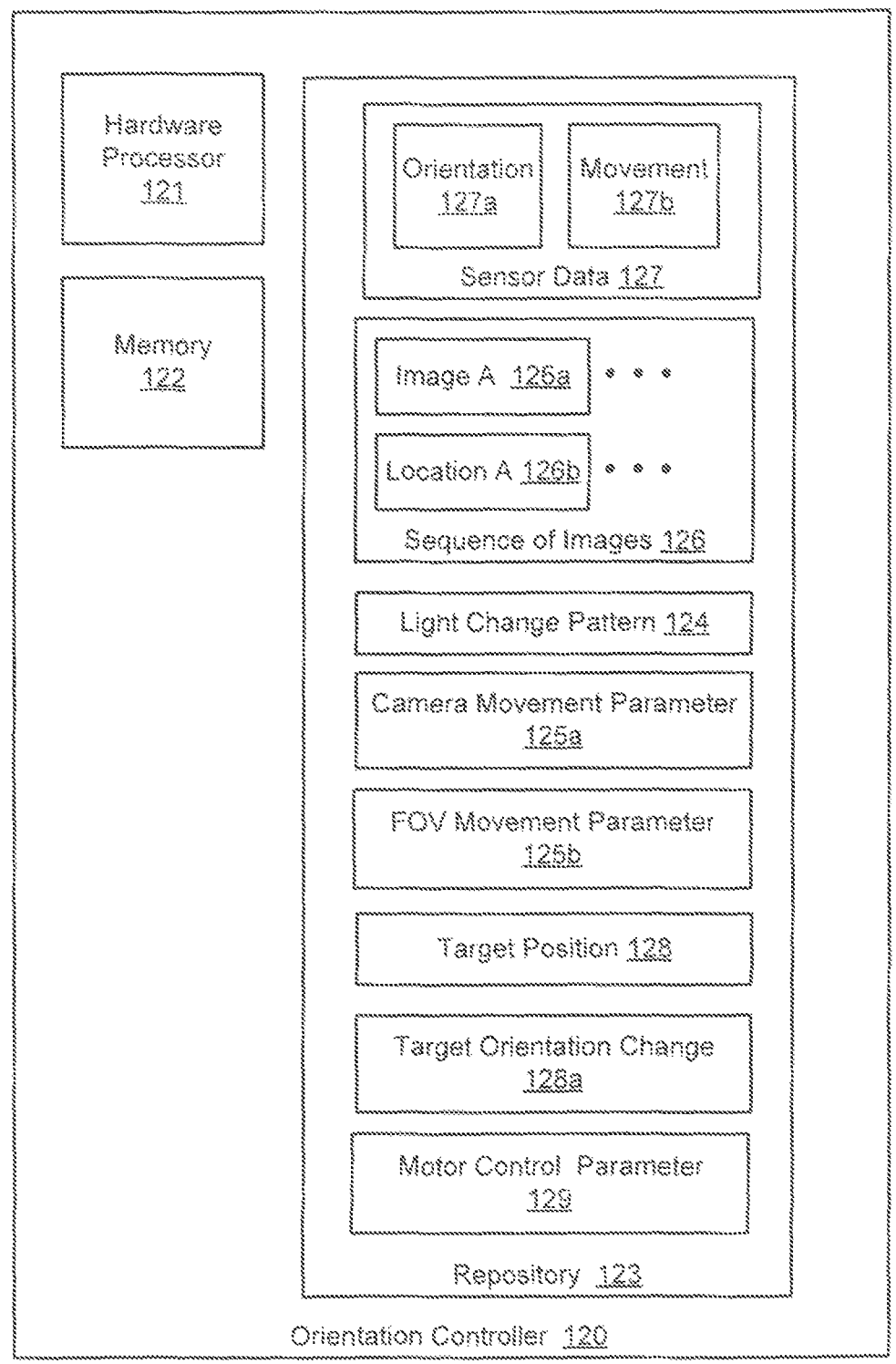
FIG. 1.2

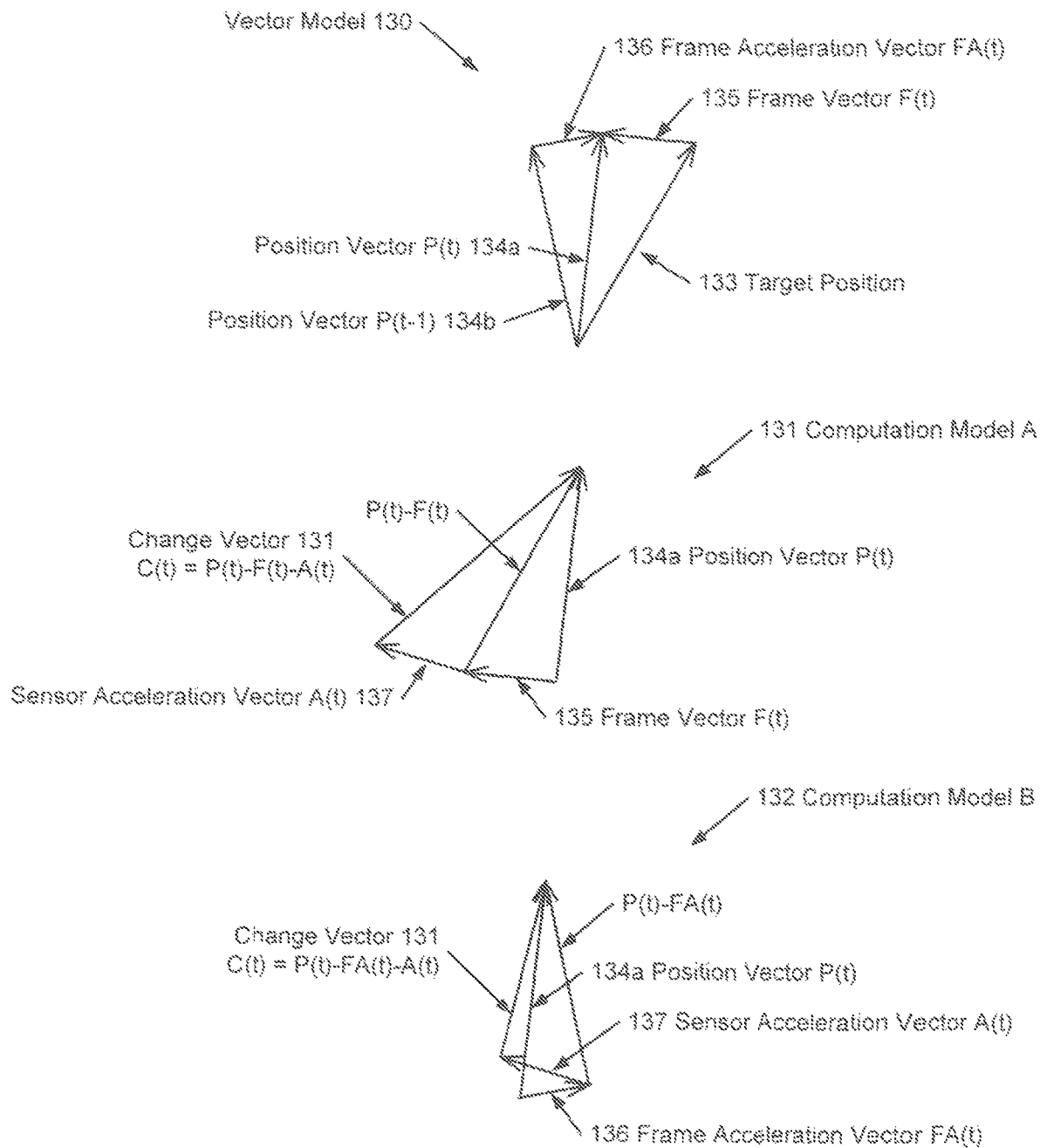
FIG. 1.3

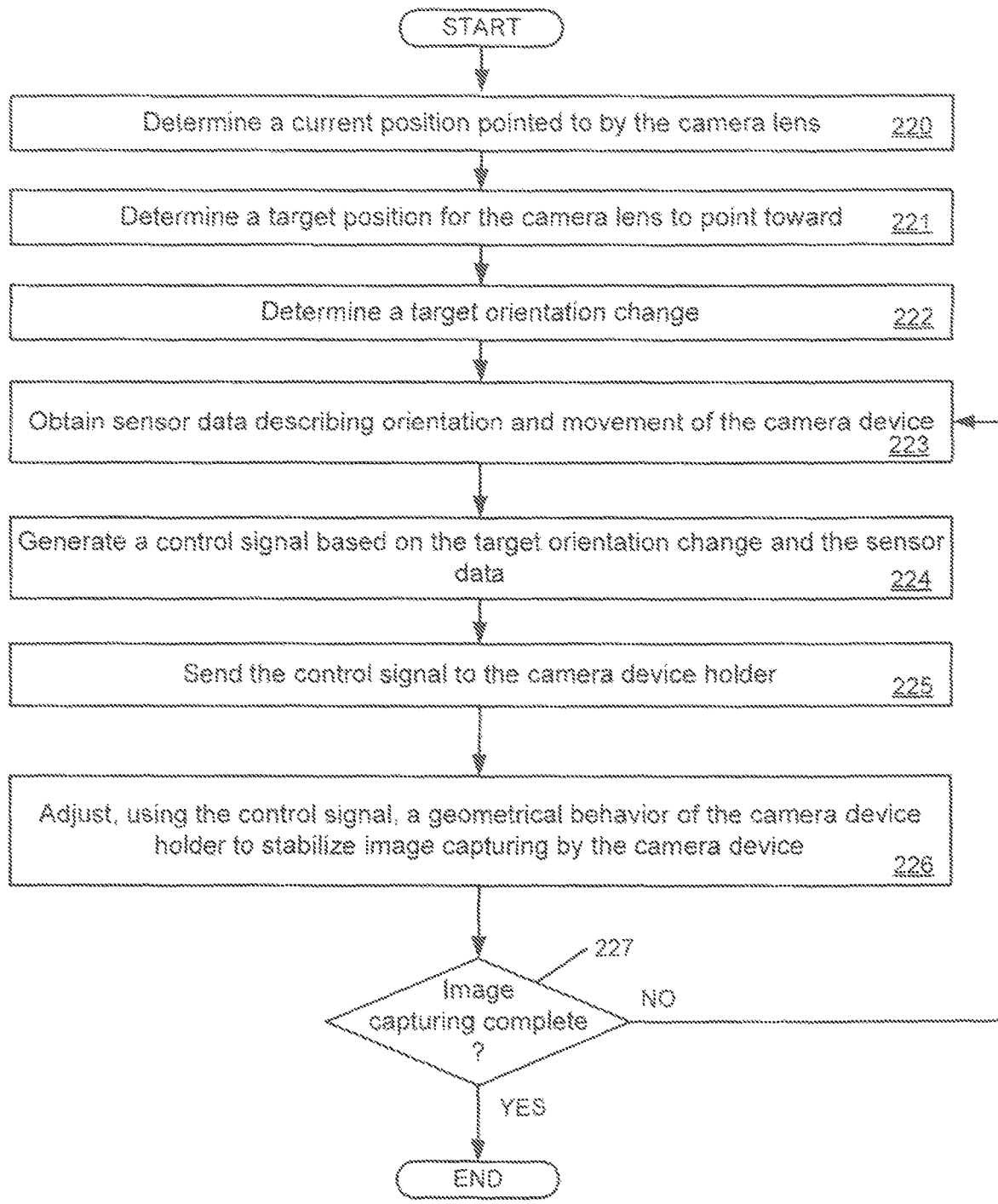
FIG. 2.1

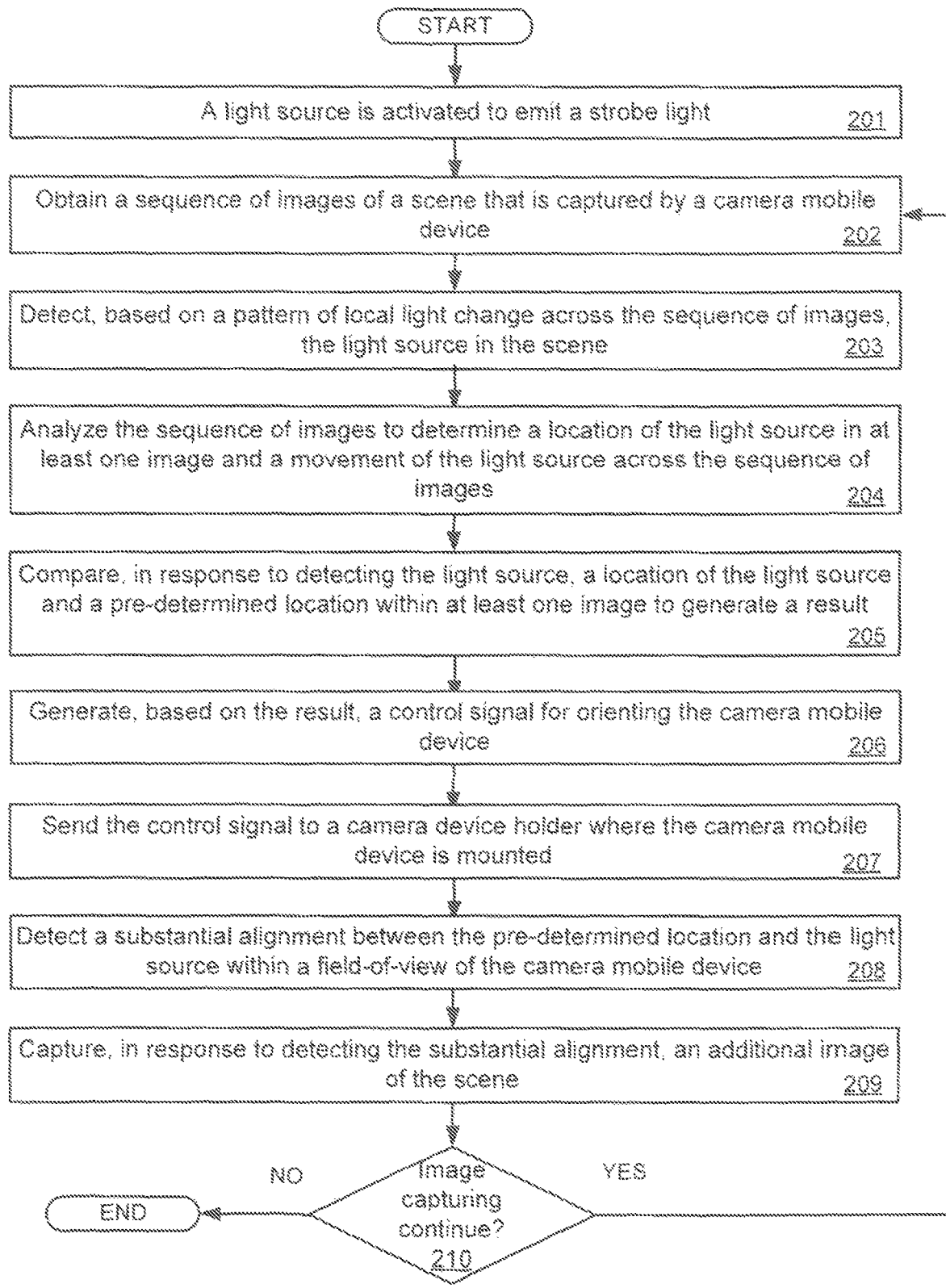
FIG. 2.2

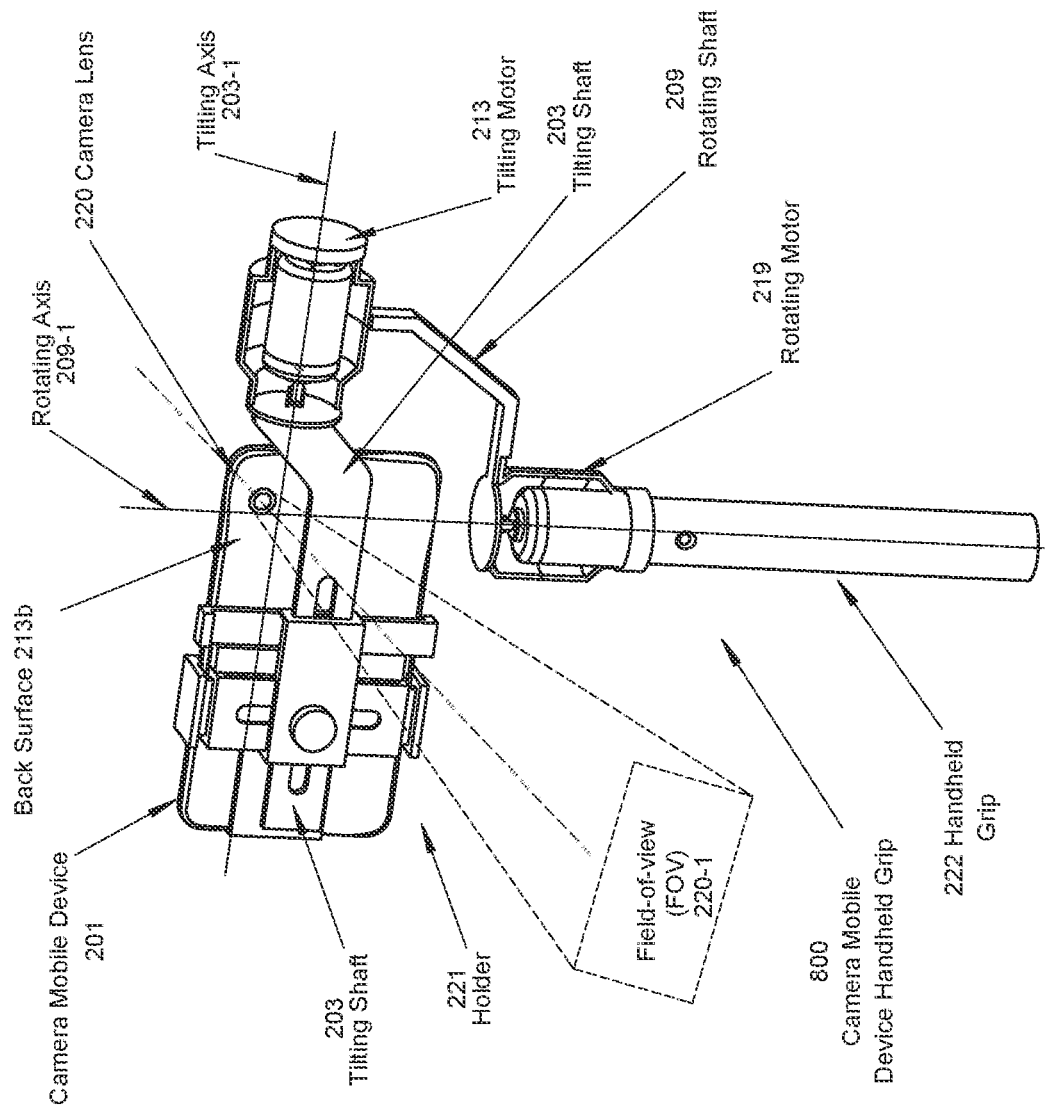
FIG. 3.1

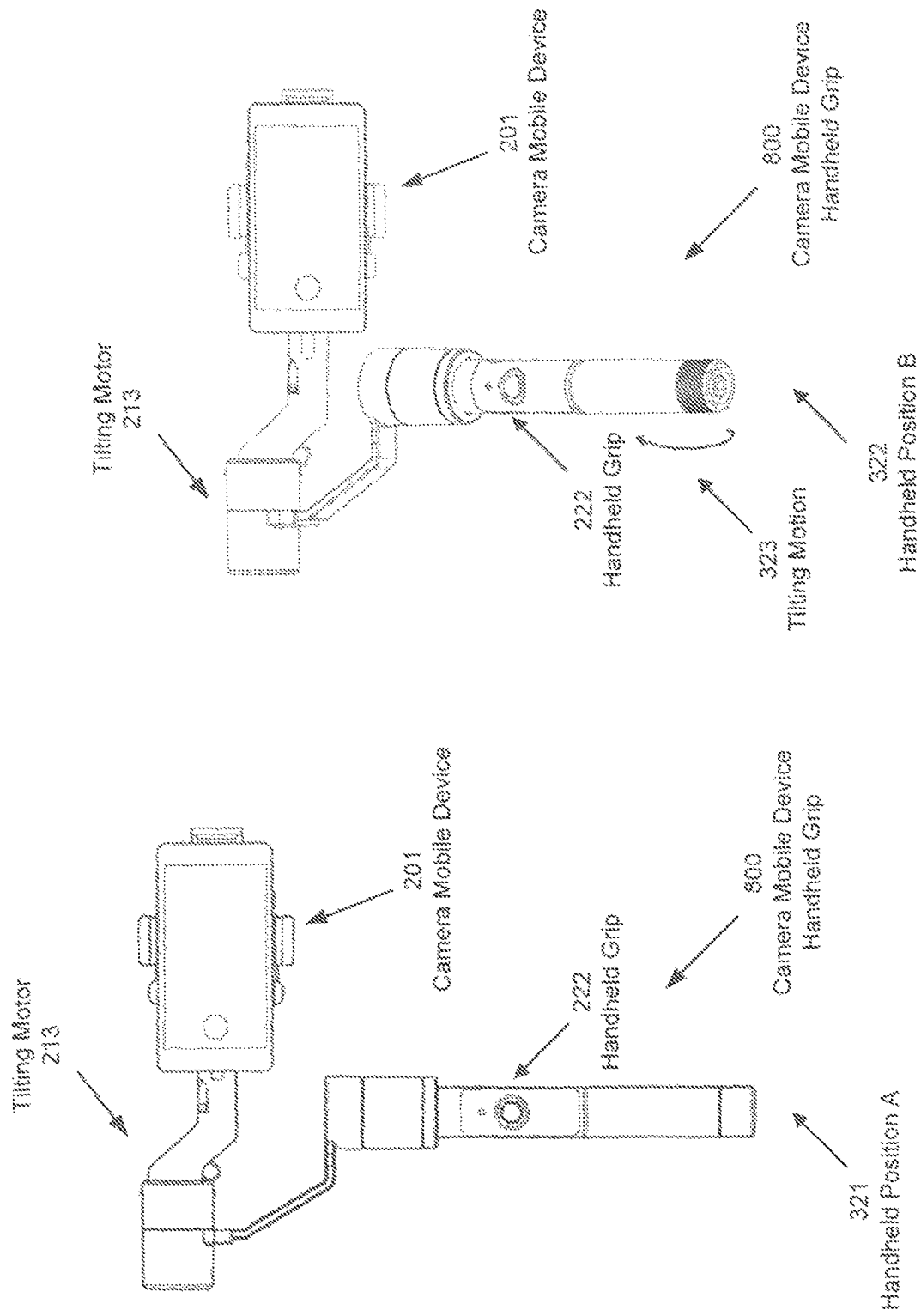
FIG. 3.2

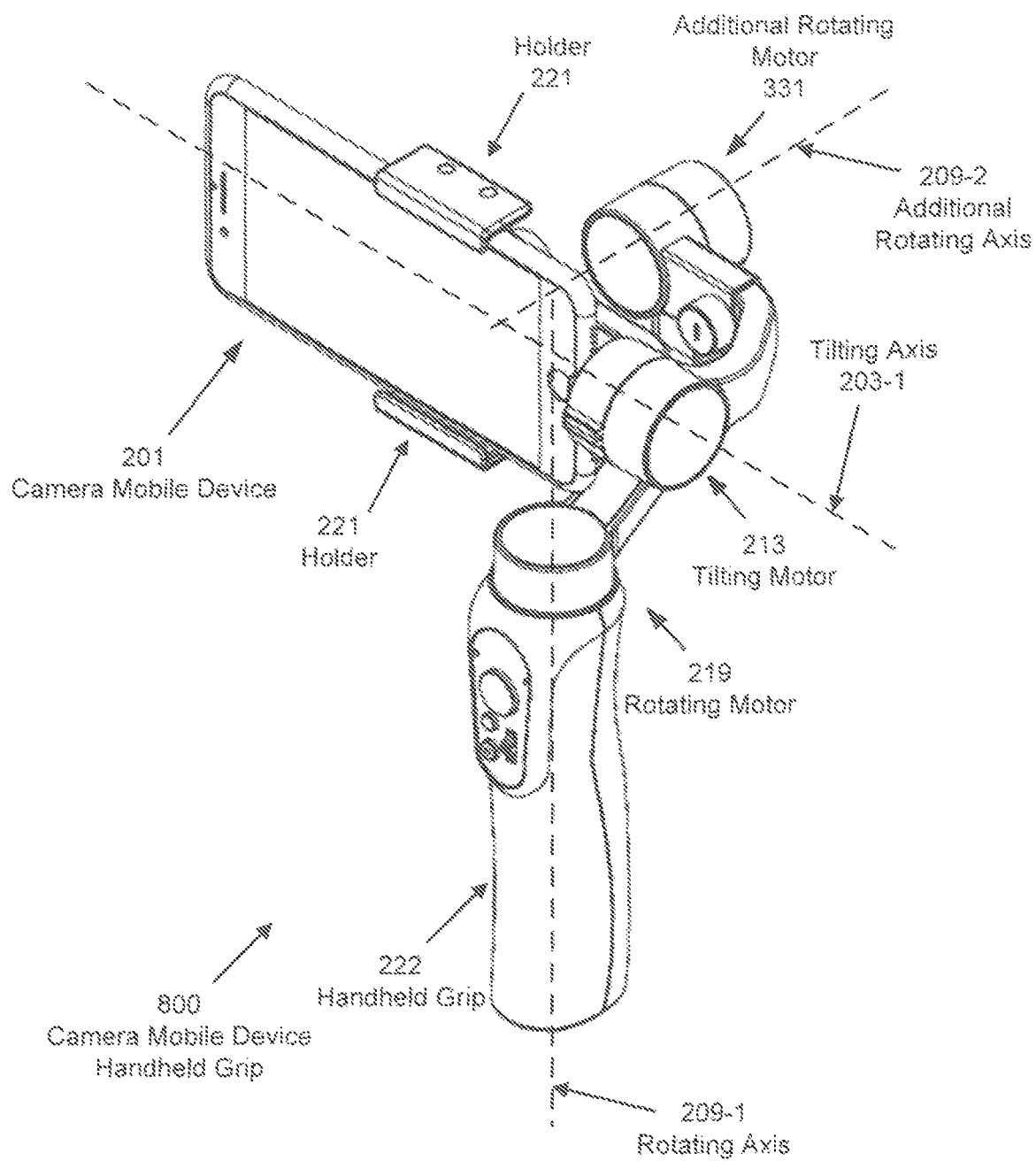
FIG. 3.3

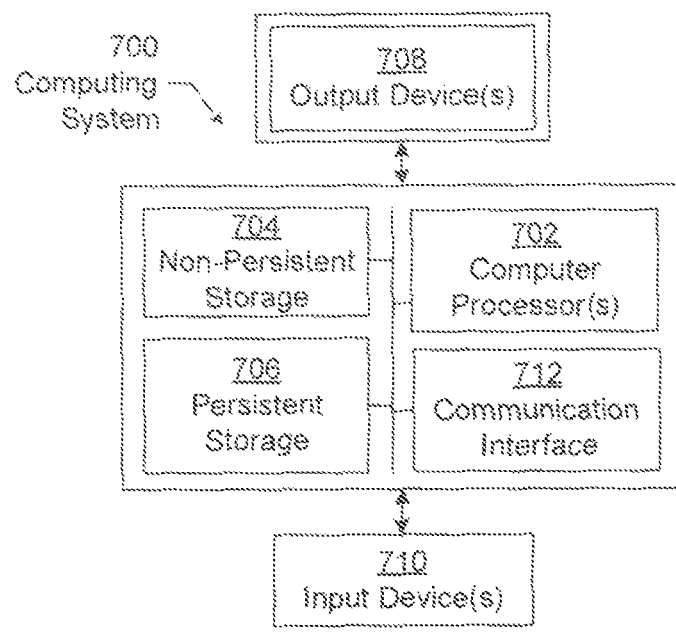
FIG. 7.1
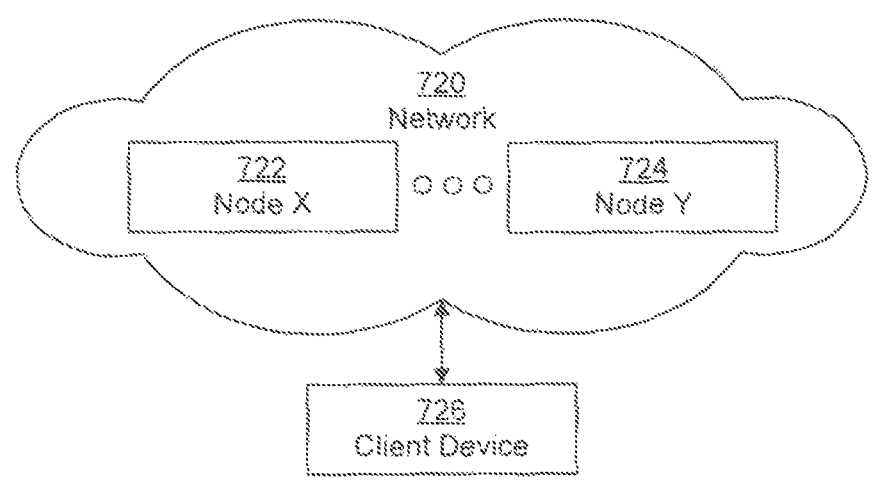
FIG. 7.2

CAMERA MOBILE DEVICE HOLDER WITH STABLIZATION

BACKGROUND

A field-of-view (FOV) is an extent of a scene that is imaged by a camera. An object inside the FOV will appear in an image captured and/or outputted by the camera. For example, the FOV may correspond to a solid angle within which a camera lens projects light input to an optical sensor of the camera. During image capturing using a handheld camera, movement of the camera often causes unintentional changes of object position in the captured images.

Hand shaking of a camera user often results in blurry or out-of-focus images or videos. Gimbal or stabilizer are used for stabilizing a camera device during image capturing. Such solutions require two or more motion sensors, e.g., gyroscopes, with associated electronic circuits to obtain information for computing control signal(s) to correct the user hand shaking. Motion sensors and associated electronic circuits increase manufacturing cost and product size.

SUMMARY

In general, in one aspect, the invention relates to a method to stabilize a camera device. The method includes receiving, from the camera device mounted in a camera device holder, sensor data representing at least one selected from a group consisting of orientation and movement of the camera device, generating, using a pre-determined algorithm, a control signal based on the sensor data, and adjusting, using the control signal, a geometrical behavior of the camera device holder, wherein the geometrical behavior corresponds to at least one selected from a group consisting of the orientation and the movement of the camera device holder.

In general, in one aspect, the invention relates to an orientation controller for stabilizing a camera device. The orientation controller includes a computer processor and memory storing instructions, when executed, causing the computer processor to receive, from the camera device mounted in a camera device holder, sensor data representing at least one selected from a group consisting of orientation and movement of the camera device, generate, using a pre-determined algorithm, a control signal based on the sensor data, and adjust, using the control signal, a geometrical behavior of the camera device holder, wherein the geometrical behavior corresponds to at least one selected from a group consisting of the orientation and the movement of the camera device holder.

In general, in one aspect, the invention relates to a non-transitory computer readable medium storing instructions for stabilizing a camera device. The instructions, when executed by a computer processor, include functionality for receiving, from the camera device mounted in a camera device holder, sensor data representing at least one selected from a group consisting of orientation and movement of the camera device, generating, using a pre-determined algorithm, a control signal based on the sensor data, and adjusting, using the control signal, a geometrical behavior of the camera device holder, wherein the geometrical behavior corresponds to at least one selected from a group consisting of the orientation and the movement of the camera device holder.

Other aspects of the invention will be apparent from the following description and the appended claims.

BRIEF DESCRIPTION OF DRAWINGS

FIGS. 1.1 and 1.2 show a schematic block diagram of a system in accordance with one or more embodiments of the invention.

FIG. 1.3 shows a vector diagram in accordance with one or more embodiments of the invention.

FIGS. 2.1 and 2.2 show method flowcharts in accordance with one or more embodiments of the invention.

FIGS. 3.1, 3.2, 3.3, 4, 5, and 6 show various examples in accordance with one or more embodiments of the invention.

FIGS. 7.1 and 7.2 show a computing system in accordance with one or more embodiments of the invention.

DETAILED DESCRIPTION

Figure 4:
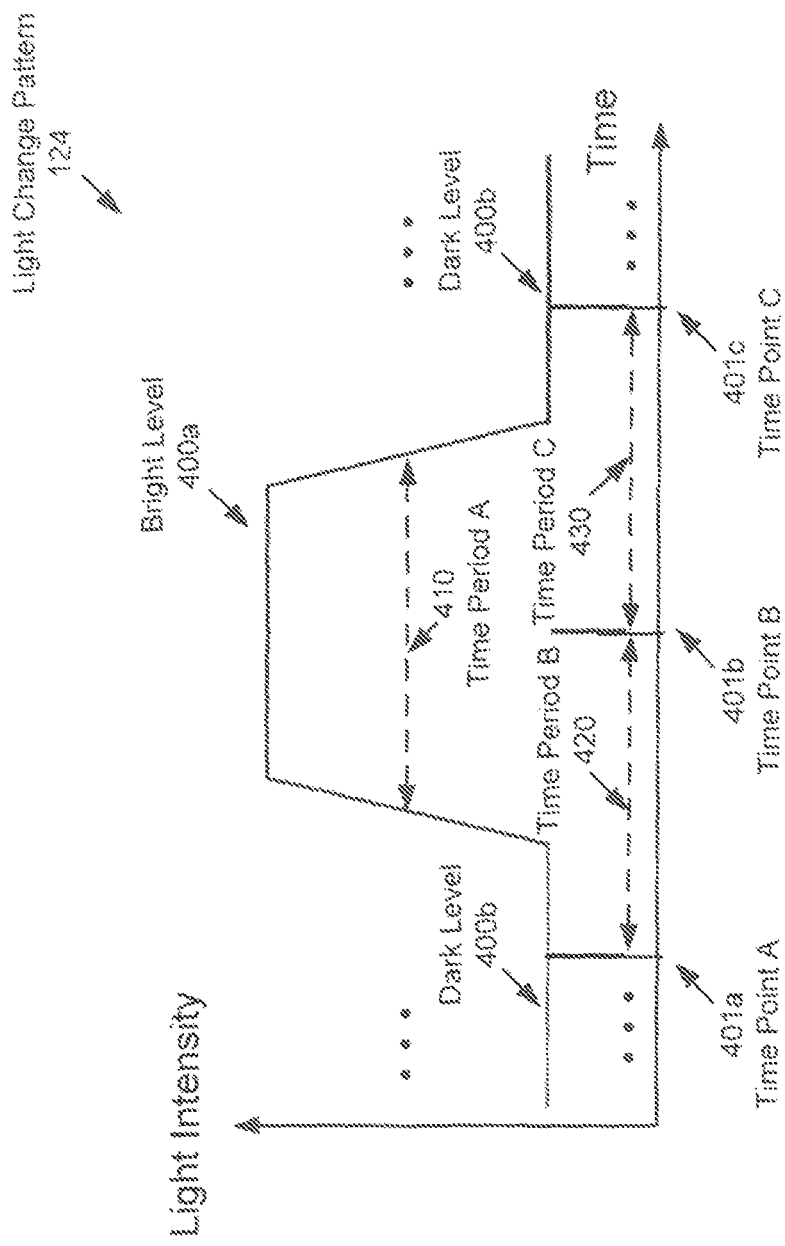

Specific embodiments of the invention will now be described in detail with reference to the accompanying figures. Like elements in the various figures may be denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description, any component described with regard to a figure, in various embodiments of the invention, may be equivalent to one or more like-named components described with regard to any other figure. For brevity, at least a portion of these components are implicitly identified based on various legends. Further, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure. In the figures, black solid collinear dots indicate that additional components similar to the components before and/or after the solid collinear dots may optionally exist. Further, a solid line or a dash line connecting the components of a figure represent a relationship between the connected components. The dash line indicates that the relationship may not include or otherwise associate with any physical connection or physical element.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention provide a system, a method, and a computer readable medium for stabilizing a camera device during image capturing. In particular, sensor data is received from the camera device mounted in a camera device holder. The sensor data represents orientation and/or movement of the camera device. A control signal is then generated, using a pre-determined algorithm, based on at least the sensor data. Using the control signal, a geometrical behavior of the camera device holder is adjusted, where the geometrical behavior corresponds to the orientation and/or movement of the camera device holder.

FIG. 1.1 shows a system (100) in accordance with one or more embodiments. In one or more embodiments, one or more of the modules and elements shown in FIG. 1.1 may be omitted, repeated, and/or substituted. Accordingly, embodiments of the invention should not be considered limited to the specific arrangements of modules shown in FIG. 1.1.

As shown in FIG. 1.1, the system (100) includes a camera device (110) having a camera lens (111) and sensor (112), an orientation controller (120), a camera device holder (130), a scene (140), a field-of-view (FOV) (141) of the camera lens (111), an object (142) appearing within the FOV (141), and a light source (143) attached to the object (142). Further, the camera device (110), orientation controller (120), and camera device holder (130) are communicatively coupled to each other. In particular, the orientation controller (120) and the camera device holder (130) are collectively referred to as a stabilized camera device holder (125). In one or more embodiments of the invention, two or more of the camera device (110), orientation controller (120), and camera device holder (130) are integrated into a single device. For example, at least a portion of the orientation controller (120) may be included in the camera device (110). In another example, at least a portion of the orientation controller (120) may be included in the camera device holder (130). In still another example, one part of the orientation controller (120) is included in the camera device (110) while another part of the orientation controller (120) is included in the camera device holder (130). Depending on which of the examples, the stabilized camera device holder (125) may be a logical combination or a physical combination of the orientation controller (120) and the camera device holder (130).

In one or more embodiments of the invention, the light source (143) is any device that emits light. In one or more embodiments, the light source (143) includes a light-emitting-diode (LED). In one or more embodiments, the light source (143) emits a strobe light, which changes intensity and/or color from time to time. For example, the strobe light may emit a free-running light change pattern according to a particular duty cycle (i.e., a percentage of time when the light pattern has a bright level) and repetition rate (i.e., a number of time the intensity changes during a unit time period). As used herein, light change pattern is a pattern of intensity and/or color change in the light. In one or more embodiments, the light source (143) emits a light change pattern with a low repetition rate (e.g., 10 hertz, 20 hertz, etc.) comparing to a frame rate of the camera device (110). The frame rate is a number of images (e.g., a burst of still images or a video recording) captured by the camera device (110) during a unit time. In one or more embodiments, the light source (143) emits a light change pattern that is synchronized with the frame rate of the camera device (110).

In one or more embodiments of the invention, the camera device (110) is a device with a camera lens (e.g., camera lens (111)) and associated components for taking photographs and/or video recordings. A dedicated camera with communication capability is an example of the camera device (110). In one or more embodiments, the camera device (110) is a mobile device, such as a mobile phone with a built-in camera, referred to as a smart phone. A smart phone may have a display with graphical user interface that occupy a large portion (e.g., 70% or larger) of the front surface. The camera lens (111) may be on the front surface or back surface of the smart phone. In one or more embodiments, the camera device (110) includes a timer to control the frame rate of image capture based on the duty cycle and/or repetition rate of the light source (143). In one or more embodiments, the camera device (110) includes the sensor (112), which may include one or more of an accelerometer, gyroscope, magnetometer, gravity sensor, global positioning system (GPS), etc. The sensor data from the sensor (112) corresponds to measurements that generally influence current and/or future orientation and/or movement of the camera device (110). In one or more embodiments, in addition to, or instead of, the sensor (112) in the camera device (110), the camera device holder (130) includes an embedded sensor having similar functionality as the sensor (112).

In one or more embodiments, the scene (140) is a place where an action or event, imaged by the camera device (110), occurs. The field-of-view (FOV) (141) is an extent of the scene (140) that is imaged by the camera device (110) using the camera lens (111). In other words, an object inside the FOV (141) will appear in an image captured and/or outputted by the camera device (110). For example, the FOV (141) may correspond to a solid angle within which the camera lens (111) projects light input to an associated optical sensor (not shown) of the camera device (110). In one or more embodiments, the FOV (141) corresponds to different portions of the scene (140) according to how the camera lens (111) is oriented toward, zoomed with respect to, or otherwise positioned relative to, the scene (140). In one or more embodiments, the camera device (110) includes a hardware component, a software component, or a combination thereof. In one or more embodiments, the camera device (110) may include, or otherwise be implemented using, at least a portion of the computing system (700) and network (720) described in reference to FIGS. 7.1 and 7.2 below.

In one or more embodiments of the invention, the camera device holder (130) is configured to mechanically hold the camera device (110) and to adjust, in response to a control signal from the orientation controller (120), the FOV (141) of the camera lens (111). For example, the camera device holder (130) may include a motorized tilt and swivel device for adjusting a camera angle of the camera lens (111). In another example, the camera device holder (130) may include a motorized horizontal and vertical sliding device for adjusting a position of the camera lens (111) relative to the scene (140). The sliding device may include a mechanical stage for holding and moving the camera device (110). Examples of the camera device holder (130) are described in reference to FIGS. 3.1 and 3.3 below.

In one or more embodiments, the orientation controller (120) includes a hardware component, a software component, or a combination thereof that is configured to generate the aforementioned control signal to adjust the FOV (141) of the camera lens (111). In particular, the orientation controller (120) uses a pre-determined algorithm to generate the control signal based on the sensor data from the sensor (112). An example of the pre-determined algorithm is described in reference to FIGS. 1.3, 2.1, and 2.2 below. For example, the orientation controller (120) may control the FOV (141) by way of controlling the camera device holder (130) using the control signal. In another example, the orientation controller (120) may further control the FOV (141) by way of controlling a zoom level of the camera lens (111) using the control signal. In one or more embodiments, the orientation controller (120) controls the FOV (141) such that the object (142) appears in a stable position within the FOV (141). In one or more embodiments, the orientation controller (120) controls the FOV (141) such that the object (142) moves toward a target position within the FOV (141). In one or more embodiments, the orientation controller (120) controls the FOV (141) such that the object (142) moves with improved stability/smoothness toward a target position within the FOV (141). In one or more embodiments, the orientation controller (120) controls the FOV (141) using the method described in reference to FIGS. 2.1 and 2.2 below. In one or more embodiments, the orientation controller (120) includes the components described in reference to FIG. 1.2 below.

FIG. 1.2 shows details of the orientation controller (120) in accordance with one or more embodiments. The following description of FIG. 1.2 refers to various components depicted in FIG. 1.1 above. In one or more embodiments, one or more of the modules and elements shown in FIG. 1.2 may be omitted, repeated, and/or substituted. Accordingly, embodiments of the invention should not be considered limited to the specific arrangements of modules shown in FIG. 1.2.

As shown in FIG. 1.2, the orientation controller (120) includes a hardware processor (121), memory (122), and repository (123). In one or more embodiments of the invention, the hardware processor (121) corresponds to the computer processors (702) depicted in FIG. 7.1 below. Similarly, the memory (122) and repository (123) correspond to the non-persistent storage (704) and/or persistent storage (706) depicted in FIG. 7.1 below. For example, the memory (122) may store software instructions that, when executed, cause the hardware processor (121) to perform FOV adjustment functionalities of the camera device (110) depicted in FIG. 1.1 above. In one or more embodiments, the FOV adjustment functionalities stabilize image capturing using the camera device (110). In one or more embodiments, the orientation controller (120) performs the FOV adjustment functionalities according to the method flowchart described in reference to FIGS. 2.1 and 2.2 below. In one or more embodiments, the memory (122) stores instructions to perform one or more portions of the method flowchart described in reference to FIGS. 2.1 and 2.2 below. In one or more embodiments, at least a portion of the orientation controller (120) and the camera device (110) are integrated into a single device. In such embodiments, the instructions to perform one or more portions of the method flowchart described in reference to FIGS. 2.1 and 2.2 are part of a mobile application, or mobile app, which is a user-installable software application designed to run on a smart phone or other mobile devices. In one or more embodiments, at least a portion of the orientation controller (120) and the camera device holder (130) are integrated into a single device. In such embodiments, the instructions to perform one or more portions of the method flowchart described in reference to FIGS. 2.1 and 2.2 are part of a local application (e.g., installed software, embedded firmware) designed to run on the camera device holder (130).

Further as shown in FIG. 1.2, the repository (123) includes sensor data (127), a sequence of images (126), an light change pattern (124), a camera movement parameter (125a), an FOV movement parameter (125b), a target position (128), a target orientation change (128a), and a motor control parameter (129). In particular, the sequence of images (126) includes consecutive images (e.g., image A (126a)) captured by the camera device (110). For example, the image A (126a) corresponds to a portion of the scene (140) that is covered by the FOV (141) at a particular time point.

The light change pattern (124) is a pattern of light intensity and/or color alternating between different intensity levels and/or colors across the sequence of images (126). In one or more embodiments, the light change pattern (124) corresponds to a spot in each image of the sequence of images (126). For example, the spot may be defined by a pixel position or a collection of connected pixel positions in each image. In one or more embodiments, the light change pattern (124) is caused by a strobe light emitted from the light source (143) and indicates a location of the light source (143) within each image. In other words, the location of the light source (143) within each image may be determined based on where the light change pattern (124) is found across the sequence of images (126). For example, the light change pattern (124) indicates that the light source (143) is at the location A (126b) in the image A (126a). Similarly, each other image in the sequence of images (126) is associated with a location of the light source (143).

In one or more embodiments, the light source (143) is not used during image capturing. The target position (128) is a three dimensional orientation of the camera device (110). Specifically, the orientation controller (120) is configured to orient the optical sensor of the camera device (110) toward the target position (128).

In one or more embodiments, the light source (143) is attached to the object (142) to facilitate stabilization of image capturing. The target position (128) is a pre-determined position that the orientation controller (120) is configured to position the object (142) in the FOV (141). For example, the target position (128) may be defined as the center of the FOV (141), which corresponds to the center of each image of the sequence of images (126). In other words, the orientation controller (120) is configured to adjust the FOV (141) such that the object (142) appears at the center (i.e., target position (128)) in the image after the adjustment. In other examples, the target position (128) may be defined as different positions from the center of the FOV (141). For example, the target position may be obtained from a user to specify the location where the object (142) is to be located in the image. In one or more embodiments, the target position is determined by the position of a light source (e.g., location A (126b)) in a previous image such that an object (142) appears stable (e.g., without apparent movement relative to the FOV of each image) in the sequence of images (126).

Because the position where the object (142) appears in the FOV (141) depends on the orientation of the camera device (110), the object (142) may be aligned with the target position (128) in the FOV (141) by changing the orientation of the camera device (110). The target orientation change (128a) is a computed value that indicates the amount of change in the orientation of the camera device (110) to align the object (142) with the target position (128).

In one or more embodiments, the camera movement parameter (125a) describes position, orientation, and movement information of the camera device (110). For example, the camera movement parameter (125a) may correspond to, or be derived from, sensor data of the sensor (112) in the camera device (110). In another example, the camera movement parameter (125a) may correspond to, or be derived from, sensor data of an embedded sensor in the camera device holder (130). In one or more embodiments, the camera movement parameter (125b) includes vector parameters such as a Sensor Acceleration Vector A(t) and Position Vector P(t). The Sensor Acceleration Vector A(t) represents acceleration experienced by the camera device (110) at time point "t" and is obtained using an acceleration sensor.

In one or more embodiments, the light source (143) is not used during image capturing. The Position Vector P(t) represents a three dimensional orientation, at time point "t", of the camera device (110), more specifically of the optical sensor of the camera device (110). For example, the Position Vector P(t) may be derived from gravitational sensor data that indicates the direction of earth gravity. Accordingly, the Position Vector P(t) is determined based on the difference between the camera orientation and the earth gravity. In one or more embodiments, the Position Vector P(t) is orthogonal to the optical sensor surface, which is referred to as the imaging plane. In such embodiments, the gravitational sensor is a position sensor.

In one or more embodiments, the light source (143) is attached to the object (142) to facilitate stabilization of image capturing. The Position Vector P(t) represents a three dimensional position, at time point "t", of the object (142) within the FOV (141). For example, the Position Vector P(t) may be derived from a location of the light source (143) within the FOV (141) as captured by the optical sensor of the camera device (110). In such embodiments, the optical sensor is a position sensor.

In one or more embodiments, the FOV movement parameter (125b) describes position and movement information of the object (142) within the FOV (141). In other words, the FOV movement parameter (125b) relates to the position and movement of the object (142) as imaged by the optical sensor through the camera lens (111). In one or more embodiments, the FOV movement parameter (125b) includes vector parameters such as a Frame Vector F(t) and Frame Acceleration Vector FA(t).

In one or more embodiments, the light source (143) is not used during image capturing. The Frame Vector F(t) corresponds to the difference between the Position Vector P(t) and the target position (128). The Frame Acceleration Vector FA(t) is a partial vector of the Sensor Acceleration Vector A(t). Specifically, the Frame Acceleration Vector FA(t) is the projection of the Sensor Acceleration Vector A(t) onto the imaging plane.

In one or more embodiments, the light source (143) is attached to the object (142) to facilitate stabilization of image capturing. The Frame Vector F(t) is the distance vector, at the time point "t", between the target position (128) and the location (e.g., location A (126b)) of the light source (143) within an image, i.e., as imaged by the optical sensor through the camera lens (111). In one or more embodiments, the Frame Vector F(t) includes a horizontal direction distance and a vertical distance that are calculated based on a captured or temporary image from the optical sensor. The Frame Vector F(t) may be represented based on a number of pixels or any other suitable distance scale. In one or more embodiments, the object (142) may be a moving object such that the location (e.g., location A (126b)) of the light source (143) may vary from one image to next in the sequence of images (126). In such embodiments, the Frame Acceleration Vector FA(t) is a rate of change, at the time point "t", of the location (e.g., location A (126b)) of the light source (143) over time. For example, the Frame Acceleration Vector FA(t) may be associated with a change in the location (e.g., location A (126b)) of the light source (143) from one image to next in the sequence of images (126). Depending on the moving direction of the object (142), the Frame Acceleration Vector FA(t) may include a horizontal portion and a vertical portion. Mathematically, in one or more embodiments, the Frame Acceleration Vector FA(t) corresponds to a derivative of the Frame Vector F(t) over time. Further details of the target position (128), camera movement parameter (125a), and FOV movement parameter (125b) are shown in FIG. 1.3 below.

In one or more embodiments, the motor control parameter (129) corresponds to control information for controlling the motors of the camera device holder (130) to stabilize image capturing using the camera device (110). The motor control parameter (129) corresponds to the target orientation change (128a) adjusted based on orientation and movement of the camera device (110). In one or more embodiments, motor control parameter (129) is generated by the orientation controller (120) based on one or more of the target position (128), camera movement parameter (125a), and FOV movement parameter (125b) described above. In one or more embodiments, the motor control parameter (129) includes a change vector C(t) that specifies, for the time point "t", a rotation change amount, a tilt change amount, a shift change amount, or other amount of change to be sent to the camera device holder (130) to achieve the target orientation change (128a). Examples of controlling the motors of the camera device holder (130) are described in reference to FIGS. 3.1 and 3.2 below.

In one or more embodiments, the orientation controller (120) performs the FOV adjustment functionalities based on the sequence of images (126), light change pattern (124), target position (128), camera movement parameter (125a), FOV movement parameter (125b), and motor control parameter (129) described above. Specifically, the orientation controller (120) performs the FOV adjustment functionalities using the method described in reference to FIGS. 2.1 and 2.2 below. An example of the sequence of images (126), light change pattern (124), target position (128), camera movement parameter (125a), FOV movement parameter (125b), and motor control parameter (129) is described in reference to FIGS. 3.1, 3.2, 3.3, and 4-6 below.

FIG. 1.3 shows details of the target position (128), camera movement parameter (125a), and FOV movement parameter (125b) in accordance with one or more embodiments. In one or more embodiments, one or more of the modules and elements shown in FIG. 1.3 may be omitted, repeated, and/or substituted. Accordingly, embodiments of the invention should not be considered limited to the specific arrangements of modules shown in FIG. 1.3.

As shown in FIG. 1.3, the vector model (130) shows relationships between various vectors such as Frame Vector (135)=Position Vector (134a)−Target Position (133), and Frame Acceleration Vector (136)=Position Vector (134a)−Position Vector (134b). In particular, the Frame Vector (135) corresponds to the target orientation change (128a) depicted in FIG. 1.2 above. The two relationships are represented mathematically as:

$$F(t)=P(t)-\text{Target Position}$$

$$FA(t)=P(t)-P(t-1)$$

Further, the computation model A (131) shows that the motor control parameter (129) is computed as Change Vector (131)=Position Vector (134a)−Frame Vector (135)−Sensor Acceleration Vector (137). The computation model A (131) is represented mathematically as:

$$C(t)=P(t)-F(t)-A(t)$$

where C(t) represents the Change Vector (131), which is the amount for the motors of the camera device holder (130)

to change to achieve camera stabilization for image capturing using the camera device (110).

In the embodiments where the light source is not used during image capturing, the computation model A (131) may be used to stabilize the orientation of the camera device pointing toward the Target Position. In the embodiments where the light source is used to facilitate stabilizing the image capturing, the computation model A (131) may be used to keep the light source position (representing the object) stable at the Target Position in the captured image.

In contrast, the computation model B (132) shows that the motor control parameter (129) is computed as Change Vector (131)=Position Vector (134a)−Frame Acceleration Vector (136)−Sensor Acceleration Vector (137). The computation model B (132) is represented mathematically as:

$$C(t)=P(t)-FA(t)-A(t)$$

In the embodiments where the light source is not used during image capturing, the computation model B (132) may be used to maintain the orientation of the camera device pointing toward the same direction. In the embodiments where the light source is used to facilitate stabilizing the image capturing, the computation model A (131) may be used to keep the light source position (representing the object) stable without necessarily pointing toward the Target Position.

In one or more embodiments, the computation model A (131) and computation model B (132) are combined for moving the light source position (representing the object) smoothly toward the target position. The change vector may be computed as:

$$C(t)=w_1*F(t)+w_2*FA(t)+w_3*P(t)-w_4*A(t)$$

Specifically, $w_1$, $w_2$, $w_3$, and $w_4$ are weight factors that may be changed in different situations.

FIG. 2.1 shows a flowchart in accordance with one or more embodiments. In particular, the flowchart is an example of the aforementioned pre-determined algorithm for generating the control signal to adjust the orientation of the camera device for compensating undesired camera movement, such as to correct the user handshaking. The process shown in FIG. 2.1 may be executed, for example, by one or more components discussed above in reference to FIGS. 1.1 and 1.2. One or more steps shown in FIG. 2.1 may be omitted, repeated, and/or performed in a different order among different embodiments of the invention. Accordingly, embodiments of the invention should not be considered limited to the specific number and arrangement of steps shown in FIG. 2.1.

Initially in Step 220, a current position pointed to by the camera lens is determined. In one or more embodiments, the current position is determined based on gravity sensor data. In one or more embodiments, the current position is determined based on a light source location in the FOV. In other words, the light source location in the FOV indicates the position toward which the camera lens is pointed. In one or more embodiments, the light source location in the FOV is determined using the method described in reference to FIG. 2.2 below.

In Step 221, a target position is determined. In one or more embodiments without using the light source, the target position is default to be a horizontal direction such that the camera lens is stabilized to face the earth horizon. In one or more embodiments using the light source, the target position is default to be the center of the FOV such that the object attached with the light source appears at or near the center of the FOV. In one or more embodiments, the target position is obtained from a user to specify the orientation of the camera lens or to specify the location where the object is to be located in the FOV. In one or more embodiments, the target position is determined by the previous orientation of the camera lens or determined by the position of the light source in a previous image such that an object appears stable (e.g., without apparent movement with respect to the FOV) in a sequence of captured images.

In Step 222, a target orientation change is determined based on the current position and the target position. In one or more embodiments, the target orientation change is determined as a difference vector between the current position and the target position. Specifically, the target orientation change corresponds to a desired change in the orientation of the camera lens such that the current position of the camera lens may be adjusted to or maintained at the target position.

In Step 223, sensor data is obtained that describes orientation and/or movement of the camera device. In one or more embodiments, the sensor data is obtained from the camera device mounted in the camera device holder. In one or more embodiments, the sensor data is obtained from an embedded sensor in the camera device holder. In one or more embodiments, the sensor data is obtained from the camera device mounted in the camera device holder, as well as from an embedded sensor in the camera device holder. Specifically, the sensor data indicates a likely change, due to the orientation and/or movement of the camera device, to the current position pointed to by the camera lens. In other words, the current position pointed to by the camera lens may be extrapolated to a incrementally future time point based on the sensor data.

In Step 224, a control signal is generated based on the target orientation change and the sensor data. Initially, the control signal is generated to activate motor(s) in the camera device holder to change the camera orientation by the amount of the target orientation change. Because the current position pointed to by the camera lens is likely to change due to the orientation and/or movement of the camera device, the control signal is adjusted based on the sensor data to take into account the orientation and movement of the camera device. In other words, the control signal is generated/adjusted based on the extrapolated difference between the current position and target position by taking into account the orientation and movement of the camera device.

In Step 225, the control signal is sent to the camera device holder using a communication link between the camera device and the camera device holder. In one or more embodiments, the control signal includes a rotating control signal and a tilting control signal for controlling a rotation motor and a tilting motor, respectively of the camera device holder.

In Step 226, using the control signal, a geometrical behavior of the camera device holder is adjusted. In one or more embodiments, the geometrical behavior corresponds to rotating, tilting, sliding, or other motion of one or more components of the camera device holder. In one or more embodiments, adjusting the geometrical behavior of the camera device holder includes activating, using the rotating control signal, a rotating motor of the camera device holder, and activating, using the tilting control signal, a tilting motor of the camera device holder. In one or more embodiments where a previous orientation of the camera device is used as the target orientation, the target orientation is updated using a current orientation of the camera device after adjustment using the control signal.

In Step 227, a determination is made as to whether the image capturing has completed. If the determination is negative, i.e., the image capturing is continuing, the method returns to Step 223. If the determination is positive, i.e., the image capturing is completed, the method ends.

FIG. 2.2 shows a flowchart in accordance with one or more embodiments. The process shown in FIG. 2.2 may be executed, for example, by one or more components discussed above in reference to FIGS. 1.1 and 1.2. One or more steps shown in FIG. 2.2 may be omitted, repeated, and/or performed in a different order among different embodiments of the invention. Accordingly, embodiments of the invention should not be considered limited to the specific number and arrangement of steps shown in FIG. 2.2.

Initially, in Step 201, a light source within a scene is activated. In one or more embodiments of the invention, the light source is attached to an object in the scene. In one or more embodiments, the light source emits a strobe light, which changes intensity and/or color from time to time. For example, the strobe light emits a free-running light pattern in response to the light source being activated (e.g., turned on). In one or more embodiments, the light source emits a strobe light with a low repetition rate (e.g., 10 hertz, 20 hertz, etc.) comparing to a frame rate of a camera device. In one or more embodiments, the light source emits a strobe light that is synchronized with the frame rate of the camera device. For example, the strobe light may be initiated and/or synchronized based on a trigger signal sent from a tracking controller and/or the camera device.

In Step 202, a sequence of images of the scene is captured by a camera device. In particular, the object is within the field-of-view (FOV) of the camera lens and appears in the sequence of images. For example, the sequence of images may include or be part of a burst of still images. In another example, the sequence of images may include or be part of a video recording. In one or more embodiments, the sequence of images of the scene is captured while the light source emits the strobe light. In one or more embodiments, the frame rate of the sequence of images is selected based on the duty cycle and/or repetition rate of the light source such that consecutive images (or a pair of images with a particular separation in the sequence) include alternating bright level and dark level, and/or alternating colors from the light source. For example, the light source may be free running and the frame rate is selected based on a pre-determined duty cycle and/or repetition rate of the free running light source. In one or more embodiments, a timer of the camera device is used to control image capture according to the selected frame rate.

In one or more embodiments, the duty cycle and/or repetition rate of the light source is selected based on the frame rate of the sequence of images such that consecutive images (or a pair of images with a particular separation in the sequence) include alternating bright level and dark level, and/or alternating colors from the light source. For example, the frame rate may be pre-determined and the light source is synchronized to the frame rate, e.g., based on a trigger signal from the camera device.

In Step 203, based on a local light change pattern across the sequence of images, the light source is detected in the scene. Specifically, the strobe light emitted from the light source causes changes in light intensity and/or color received by an optical sensor of the camera device resulting in the local light change pattern across the sequence of images. In one or more embodiments, the intensity of the strobe light is adjusted to control the size of the location where the local intensity change pattern is found in each image. For example, the location size may be limited to a percentage (e.g., 1%, 3%, etc.) of the horizontal and vertical dimensions of the FOV. In one or more embodiments, the location and the size are defined where the difference in alternating bright level and dark level, and/or alternating colors, in consecutive images, as recognized by the optical sensor of the camera device, exceeds a pre-determined threshold. In one or more embodiments, the location is referred to as the location of the light source in the image.

In one or more embodiments, a pair of images in the sequence of images are compared by subtraction of intensity and/or color values of corresponding pixels. Specifically, the intensity and/or color values are generated by the optical sensor. In particular, the intensity and/or color value of a pixel in one image is subtracted from the intensity and/or color value of the corresponding pixel in another image to generate a subtraction result. The pixel where the difference in alternating bright level and dark level, and/or alternating colors, is found in the subtraction result is selected as part of the location of the light source in the image. Depending on the duty cycle/repetition rate of the light source versus the frame rate of the sequence of images, the pair of images may be consecutive images or two images separated by a particular number of images, such as every three images, etc.

In Step 204, the sequence of images is analyzed to determine a location of the light source in at least one image and a movement of the light source across the sequence of images. In one or more embodiments, the location of the light source is determined based on where the difference in alternating bright level and dark level, and/or alternating colors in the sequence of images, as recognized by the optical sensor of the camera device, exceeds the pre-determined threshold. In one or more embodiments, the movement of the light source is determined based on a rate of change of the location over the sequence of images.

In Step 205, in response to detecting the light source, the location of the light source and a target position within at least one image are compared to generate a result. In one or more embodiments, the result includes the displacement from the location to the target position. In one or more embodiments, the displacement may vary from one image to next in the sequence of images, indicating that the object is a moving object. In such embodiments, the rate of change of the displacement over time, e.g., from one image to next, is computed as a movement parameter.

In Step 206, a control signal is generated based on the result for orienting the camera device. In one or more embodiments, the control signal is configured to adjust the orientation of the camera lens in the opposite direction to the displacement. For example, if the displacement indicates that the target position is to the right of the light source location within the image, the control signal adjusts the orientation of the camera lens toward the left. In one or more embodiments, the control signal is configured to adjust the relative position of the camera with respect to the scene in the opposite direction to the displacement. For example, if the displacement indicates that the target position is to the right of the light source location within the image, the control signal adjusts the relative position of the camera toward the left. In one or more embodiments, the movement parameter is considered in fine tuning the amount of adjustment caused by the control signal.

In Step 207, the control signal is sent to a camera device holder (e.g., a tilt-and-swivel device or a mechanical stage) where the camera device is mounted. Accordingly, the orientation of the camera lens or a relative position of the camera device is adjusted in the opposite direction to the displacement.

In Step 208, a substantial alignment between the target position and the light source is detected within the FOV of the camera device. In particular, the substantial alignment is a result of adjusting the orientation of the camera lens or a relative position of the camera device in the opposite direction to the displacement.

In Step 209, in response to detecting the substantial alignment, an additional image of the scene is captured. In one or more embodiments, consecutive images are continuously captured and outputted by the camera device at a regular repetition rate (i.e., frame rate). In such embodiments, the sequence of images that is analyzed to generate the control signal is limited to a rolling time window (e.g., a rolling sequence of 2 consecutive images, 5 consecutive images, 10 consecutive images, etc.) that precedes the additional image. As time passes, the additional image becomes part of an updated sequence of images for generating an updated control signal to continuously track the object in the FOV.

In one or more embodiments, the sequence of images that is analyzed to generate the control signal is designated as control information without being outputted by the camera device. In contrast, the additional image where the light source (hence the object) substantially aligns with the target position is outputted by the camera device. For example, the control information may be stored separate from the additional image until being discarded or otherwise removed from the camera device.

In Step 210, a determination is made as to whether image capturing is to continue. If the determination is positive, i.e., the image capturing is to continue, the method returns to Step 202. If the is negative, i.e., the image capturing is not to continue, the method ends.

FIGS. 3.1, 3.2, 3.3, 4, 5, and 6 show various examples in accordance with one or more embodiments of the invention. The examples shown in FIGS. 3.1, 3.2, 4, 5, and 6 may be, for example, based on one or more components depicted in FIGS. 1.1 and 1.2 above and the method flowchart depicted in FIG. 2.1 above. In one or more embodiments, one or more of the modules and elements shown in FIGS. 3.1, 3.2, 3.3, 4, 5, and 6 may be omitted, repeated, and/or substituted. Accordingly, embodiments of the invention should not be considered limited to the specific arrangements of modules shown in FIGS. 3.1, 3.2, 3.3, 4, 5, and 6.

FIG. 3.1 shows a camera mobile device handheld grip (800) as an example of the camera device holder (130) depicted in FIG. 1.1 above. In addition, a camera mobile device (201) (e.g., a smart phone having a camera lens (220)), mechanically held by the camera mobile device handheld grip (800), is an example of the camera device (110) depicted in FIG. 1.1 above. In one or more embodiments of the invention, the camera mobile device handheld grip (800) is an electro-mechanical assembly that includes a holder (221), a tilting shaft (203), an tilting motor (213), a rotating shaft (209), a rotating motor (219), and a handheld grip (222). The holder (221) is configured to mechanically hold the camera mobile device (201) and mechanically couple to the tilting shaft (203). The handheld grip (222) is configured to maintain, while being handheld by a viewer, mechanical stability of the camera mobile device handheld grip (800). Although not explicitly shown, the handheld grip (222) includes a communication interface configured to communicate with the camera device (110) and/or the orientation controller (120) depicted in FIG. 1.1 above. For example, the communication interface may be based on Bluetooth, NFC, USB, or other wireless/wired communication interfaces. In one or more embodiments, the rotating shaft (209) is rotatable around a rotating axis (209-1) by the rotating motor (219) in response to a control signal received from the orientation controller (120) via the communication interface. Similarly, the tilting shaft (203) is rotatable by the tilting motor (213) around a tilting axis (203-1) in response to the control signal received from the orientation controller (120) via the communication interface. In response to tilting the holder (221) around the tilting axis (203-1) and/or rotating the holder (221), collectively with the tilting shaft (203) and tilting motor (213), around the rotating axis (209-1), the orientation of the camera lens (220) may be adjusted. Accordingly, the FOV (220-1) of the camera lens (220) is adjusted according to the orientation of the camera lens (220). Although the example shown in FIG. 3.1 is based on two motors associated with two mechanical shafts, other examples may be based on three motors associated with three mechanical shafts without departing from the scope of the invention wherein the third motor may be an additional rotating motor, such as the additional rotating motor (331) with the additional rotating axis (209-2) shown in FIG. 3.3. Specifically, FIG. 3.3 shows a camera mobile device handheld grip (800) with three motors as an example of the camera device holder (130) depicted in FIG. 1.1 above.

FIG. 3.2 shows an example of stabilizing the camera mobile device handheld grip (800) depicted in FIG. 3.1 above. For example, the orientation of the camera mobile device (201) is stabilized when the camera mobile device handheld grip (800) is changed from the handheld position A (321) to the handheld position B (322) or changed from the handheld position B (322) to the handheld position A (321). As shown in FIG. 3.2, the handheld position A (321) corresponds to a vertical orientation (i.e., along the earth gravity direction) of the handheld grip (222). In the handheld position A (321), the tilting motor (213) maintains the camera mobile device (201) pointing toward the earth horizon (i.e., orthogonal to the earth gravity direction). In other words, the imaging plane of the camera mobile device (201) is orthogonal to the earth horizon.

The handheld position B (322) corresponds to a tilted orientation (i.e., deviating from the earth gravity direction) of the handheld grip (222). For example, the tilting motion (323) of the handheld grip (222) is exerted by the user's hand. In the handheld position B (322), the tilting motor (213) maintains the camera mobile device (201) pointing toward the earth horizon as in the handheld position A (321).

In one scenario of the example shown in FIG. 3.2, the computation model A (131) may be used to stabilize the orientation of the camera device pointing toward the target position, which is the horizontal direction by default or by user specification. In a different scenario of the example shown in FIG. 3.2, the computation model B (132) may be used to stabilize the orientation of the camera device pointing toward a previously held direction, which turns out to be the horizontal direction. Although the example of stabilization depicted in FIG. 3.2 is based on the camera mobile device handheld grip (800) depicted in in FIG. 3.1 above, the camera mobile device handheld grip (800) depicted in in FIG. 3.3 below may also be stabilized in a similar manner.

FIG. 4 shows an example of the light change pattern (124) of the light source (143) depicted in FIGS. 1.1 and 1.2 above. As shown in FIG. 4, the horizontal axis corresponds to time and the vertical axis corresponds to light intensity. In particular, the light change pattern (124) is a pattern of light intensity alternating between a bright level (400a) and a dark level (400b) over time. For example, the bright level (400a) of the light intensity sustains over a time period A (410) and may be recurring over time with certain repetition rate. While the light intensity alternates between the bright level (400a) and the dark level (400b) over time, a sequence of images is captured by a camera device periodically. For example, consecutive images in the sequence may be captured at a time point A (401a), time point B (401b), time point C (401c), etc. that are separate from each other by a time period B (420), time period C (430), etc. In particular, the time period A (410) encompasses at least one image capture time point, such as the time point B (401b). Although the light change pattern (124) depicted in FIG. 4 is a pattern of light intensity changes, the light change pattern (124) may also include color changes in other examples. In other words, the bright level (400a) and dark level (400b) may be substituted or supplemented by different colors to represent color changes.

Figure 5:
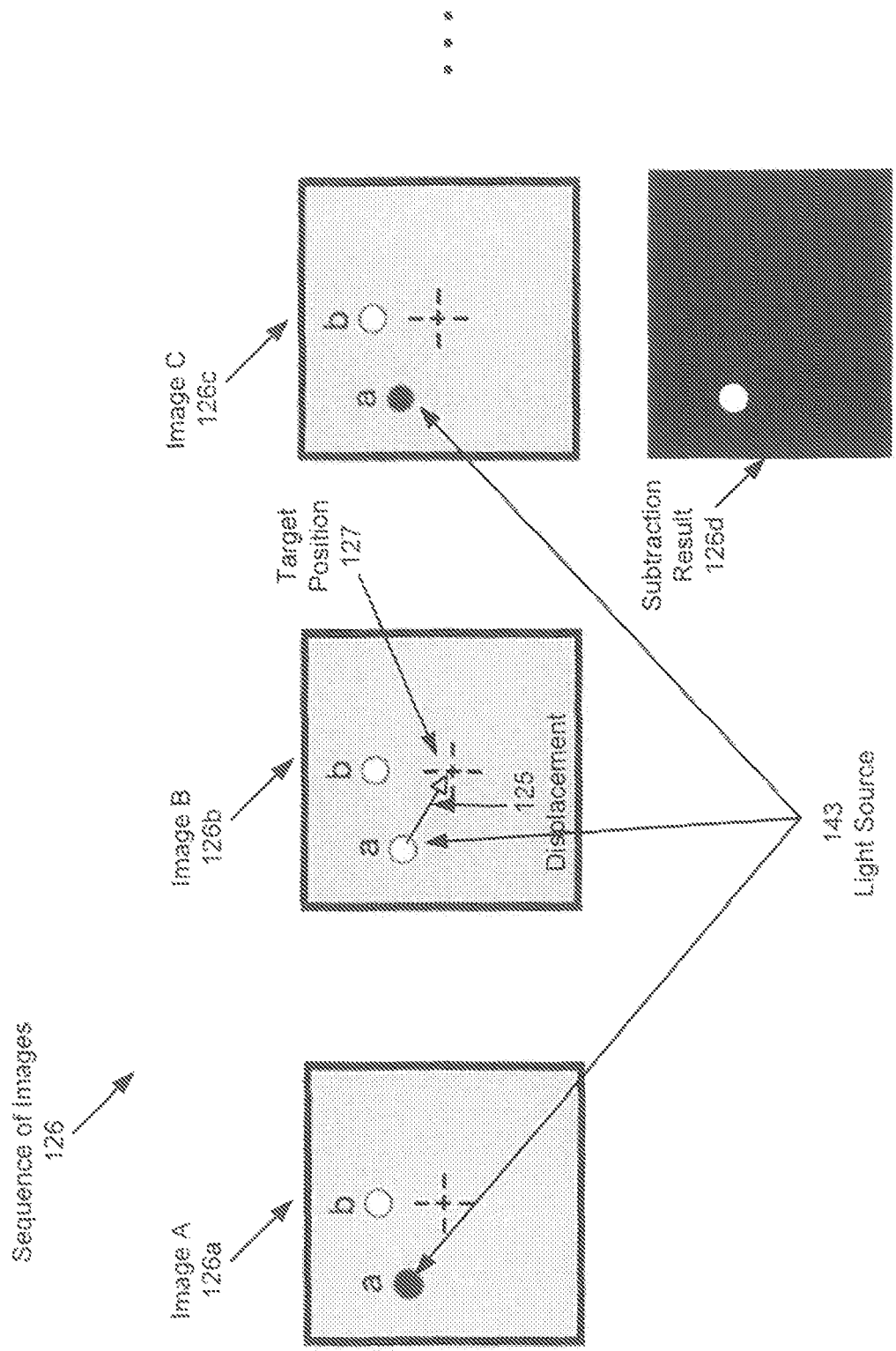

FIG. 5 shows an example of the sequence of images (126) of the scene (140) depicted in FIGS. 1.1 and 1.2 above. As shown in FIG. 5, the sequence of images (126) includes the image A (126a), image B (126b), image C (126c), etc. that are captured at the time point A (401a), time point B (401b), time point C (401c), etc. depicted in FIG. 4 above. According to the example of the light change pattern (124) described in reference to FIG. 4 above, the light source (143) appears as an alternating dark and bright spot at a location marked "a" in the image A (126a), image B (126b), image C (126c), etc. In contrast, the light intensity remains substantially constant at another location marked "b" in the image A (126a), image B (126b), image C (126c), etc. For example, the location marked "a" may be determined by subtracting intensity values of corresponding pixels in the image A (126a) and image B (126b) to generate the subtraction result (126d). Similarly, the location marked "a" may be further determined by subtracting intensity values of corresponding pixels in the image B (126b) and image C (126c) to generate the subtraction result (126d). In the subtraction result (126d), black color indicates no difference and white color indicates a non-zero difference. Accordingly, the location of the light source corresponds to the white spot in the subtraction result (126d).

Further as shown in FIG. 5, the center of each image is defined as the target position (127). Accordingly, the distance from the location marked "a" to the target position (127) corresponds to the displacement (125). The location marked "a", the target position (127), and the displacement (125) shown in FIG. 5 are examples of the location A (126b), target position (128), and camera movement parameter (125a), respectively, depicted in FIG. 1.2 above. In one or more embodiments, the location marked "a" varies between the image A (126a), image B (126b), image C (126c), etc. The rate of change of the location marked "a" across image A (126a), image B (126b), image C (126c), etc. corresponds to the FOV movement parameter (125b) depicted in FIG. 1.2 above.

Figure 6:
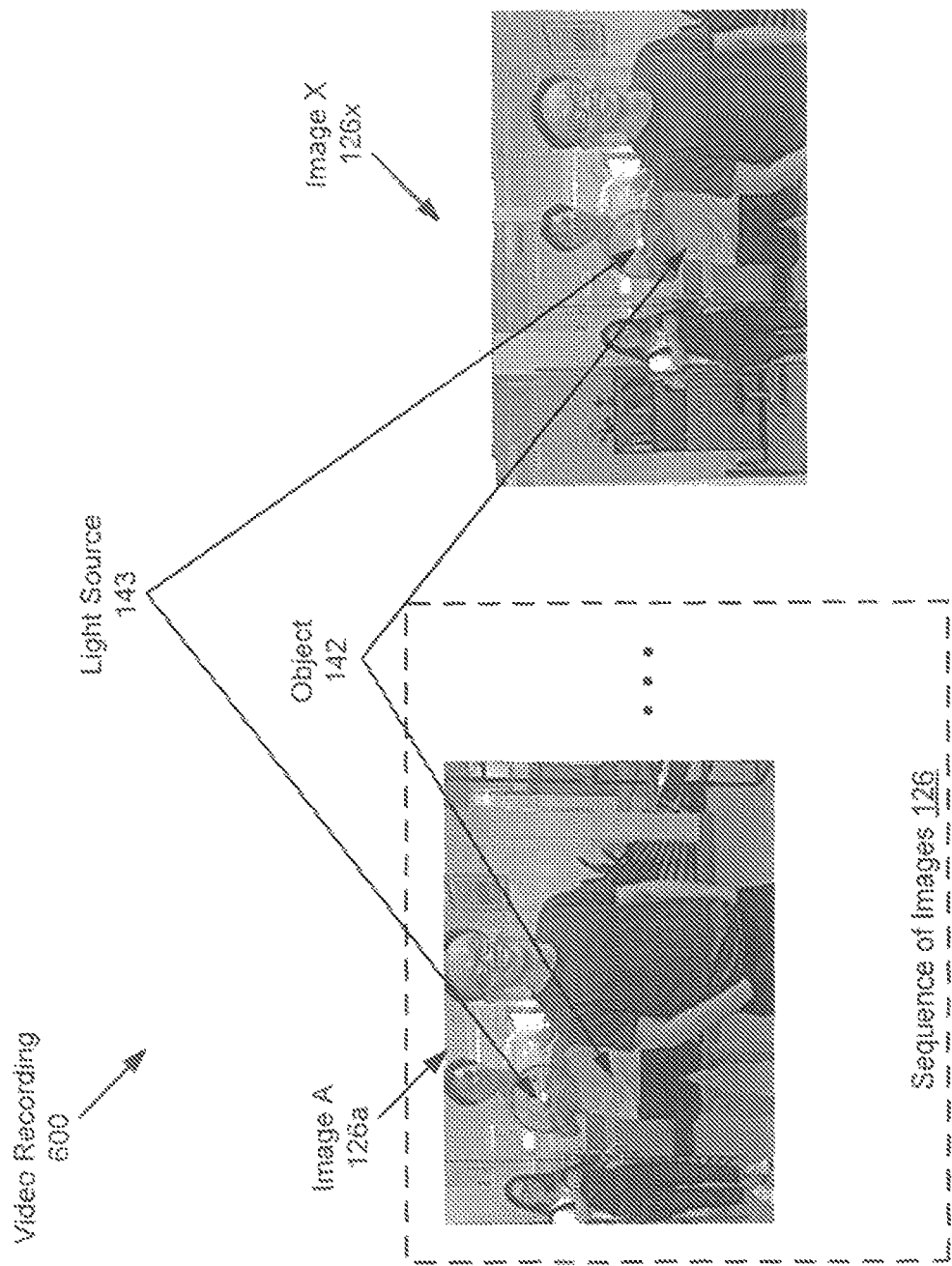

FIG. 6 shows an example video recording (600) that includes the example of the sequence of images (126) described in reference to FIG. 4 above. In an example scenario, the target position is the center of the image. As shown in FIG. 6, the light source (143) is identified at a location in the left portion of the images (e.g., image A (126a)) in the sequence of images (126). In particular, the light source (143) is held by both hands of a male person (i.e., object (142)). For example, the location of the light source (143) is identified based on the alternating dark and bright spot in the image A (126a), image B (126b), image C (126c), etc. depicted in FIG. 5 above. In other words, the light source (143) corresponds to the location marked "a" in the image A (126a), image B (126b), image C (126c), etc. depicted in FIG. 5. Because the target position (i.e., image center) is to the right of the light source location, the object orientation controller (120) is configured to orient the camera device (110) toward the left such that the male person (i.e., object (142)) holding the light source (143) appears in the center of the image. Accordingly, the orientation of the camera device (110) is adjusted based on the identified location "a" of the light source (143) such that the object (142) appears in the center of the image X (126x).

Embodiments of the invention may be implemented on a computing system. Any combination of mobile, desktop, server, router, switch, embedded device, or other types of hardware may be used. For example, as shown in FIG. 7.1, the computing system (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), and numerous other elements and functionalities.

The computer processor(s) (702) may be an integrated circuit for processing instructions. For example, the computer processor(s) may be one or more cores or micro-cores of a processor. The computing system (700) may also include one or more input devices (710), such as a touchscreen, keyboard, mouse, microphone, touchpad, electronic pen, or any other type of input device.

The communication interface (712) may include an integrated circuit for connecting the computing system (700) to a network (not shown) (e.g., a local area network (LAN), a wide area network (WAN) such as the Internet, mobile network, or any other type of network) and/or to another device, such as another computing device.

Further, the computing system (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (700) in FIG. 7.1 may be connected to or be a part of a network. For example, as shown in FIG. 7.2, the network (720) may include multiple nodes (e.g., node X (722), node Y (724)). Each node may correspond to a computing system, such as the computing system shown in FIG. 7.1, or a group of nodes combined may correspond to the computing system shown in FIG. 7.1. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (700) may be located at a remote location and connected to the other elements over a network.

Although not shown in FIG. 7.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (722), node Y (724)) in the network (720) may be configured to provide services for a client device (726). For example, the nodes may be part of a cloud computing system. The nodes may include functionality to receive requests from the client device (726) and transmit responses to the client device (726). The client device (726) may be a computing system, such as the computing system shown in FIG. 7.1. Further, the client device (726) may include and/or perform all or a portion of one or more embodiments of the invention.

The computing system or group of computing systems described in FIGS. 7.1 and 7.2 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file.

The computing system in FIG. 7.1 may implement and/or be connected to a data repository. For example, one type of data repository is a database. A database is a collection of information configured for ease of data retrieval, modification, reorganization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions present only a few examples of functions performed by the computing system of FIG. 7.1 and the nodes and/or client device in FIG. 7.2. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A method to stabilize a camera device, comprising:
   obtaining, from the camera device mounted in a camera device holder, a sequence of images of a scene;
   detecting, across the sequence of images, a light source in the scene;
   comparing, in response to detecting the light source, a location of the light source in at least one image of the sequence of images and a target position within the at least one image to generate a result;
   determining a target orientation based at least on the result;
   receiving, from the camera device mounted in the camera device holder, sensor data representing at least one selected from a group consisting of orientation and movement of the camera device;
   comparing, based on the sensor data, the orientation of the camera device and the target orientation to generate a difference;
   generating, using a pre-determined algorithm, a control signal based on at least the difference; and
   adjusting, using the control signal, a geometrical behavior of the camera device holder, wherein the geometrical behavior corresponds to at least one selected from a group consisting of the orientation and the movement of the camera device holder.

2. The method of claim 1, further comprising:
   obtaining, using at least one selected from a group consisting of an accelerometer and a gyroscope of the camera device, the sensor data.

3. The method of claim 1, further comprising:
   extrapolating, based on the sensor data, a difference of the position of the camera device and a target position to generate an extrapolated difference that takes into account the movement of the camera device,
   wherein the control signal is generated further based on the extrapolated difference.

4. The method of claim 1, further comprising:
   obtaining, prior to the comparing, a previous orientation of the camera device as the target orientation for generating the difference; and
   updating, subsequent to the comparing, the target orientation using a current orientation of the camera device.

5. The method of claim 1, further comprising:
   obtaining, from a user, the target orientation for generating the difference.

6. The method of claim 1, further comprising:
   sending the control signal to the camera device holder, wherein the control signal comprises a rotating control signal and a tilting control signal,
   wherein adjusting the geometrical behavior of the camera device holder comprises:
      activating, using the rotating control signal, a rotating motor of the camera device holder; and
      activating, using the tilting control signal, a tilting motor of the camera device holder.

7. An orientation controller for stabilizing a camera device, comprising:

a computer processor; and memory storing instructions, when executed, causing the computer processor to:
- obtain, from the camera device mounted in a camera device holder, a sequence of images of a scene;
- detect, across the sequence of images, a light source in the scene;
- compare, in response to detecting the light source, a location of the light source in at least one image of the sequence of images and a target position within the at least one image to generate a result;
- determine a target orientation based at least on the result;
- receive, from the camera device mounted in the camera device holder, sensor data representing at least one selected from a group consisting of orientation and movement of the camera device;
- compare, based on the sensor data, the orientation of the camera device and the target orientation to generate a difference;
- generate, using a pre-determined algorithm, a control signal based on at least the difference; and
- adjust, using the control signal, a geometrical behavior of the camera device holder, wherein the geometrical behavior corresponds to at least one selected from a group consisting of the orientation and the movement of the camera device holder.

8. The orientation controller of claim 7, the instructions, when executed, further causing the computer processor to:
- extrapolate, based on the sensor data, a difference of the position of the camera device and a target position to generate an extrapolated difference that takes into account the movement of the camera device,
- wherein the control signal is generated further based on the extrapolated difference.

9. The orientation controller of claim 7, the instructions, when executed, further causing the computer processor to:
- obtain, prior to the comparing, a previous orientation of the camera device as the target orientation for generating the difference; and
- update, subsequent to the comparing, the target orientation using a current orientation of the camera device.

10. The orientation controller of claim 7, the instructions, when executed, further causing the computer processor to:
- obtain, from a user, the target orientation for generating the difference.

11. The orientation controller of claim 7, the instructions, when executed, further causing the computer processor to:
- send the control signal to the camera device holder, wherein the control signal comprises a rotating control signal and a tilting control signal,
- wherein adjusting the geometrical behavior of the camera device holder comprises:
  - activating, using the rotating control signal, a rotating motor of the camera device holder; and
  - activating, using the tilting control signal, a tilting motor of the camera device holder.

12. A non-transitory computer readable medium storing instructions for stabilizing a camera device, the instructions, when executed by a computer processor, comprising functionality for:
- obtaining, from the camera device mounted in a camera device holder, a sequence of images of a scene;
- detecting, across the sequence of images, a light source in the scene;
- comparing, in response to detecting the light source, a location of the light source in at least one image of the sequence of images and a target position within the at least one image to generate a result;
- determining a target orientation based at least on the result;
- receiving, from the camera device mounted in the camera device holder, sensor data representing at least one selected from a group consisting of orientation and movement of the camera device;
- comparing, based on the sensor data, the orientation of the camera device and the target orientation to generate a difference;
- generating, using a pre-determined algorithm, a control signal based on at least the difference; and
- adjusting, using the control signal, a geometrical behavior of the camera device holder, wherein the geometrical behavior corresponds to at least one selected from a group consisting of the orientation and the movement of the camera device holder.

13. The non-transitory computer readable medium of claim 12, the instructions, when executed by the computer processor, further comprising functionality for:
- obtaining, prior to the comparing, a previous orientation of the camera device as the target orientation for generating the difference; and
- updating, subsequent to the comparing, the target orientation using a current orientation of the camera device.

14. The non-transitory computer readable medium of claim 12, the instructions, when executed by the computer processor, further comprising functionality for:
- sending the control signal to the camera device holder, wherein the control signal comprises a rotating control signal and a tilting control signal,
- wherein adjusting the geometrical behavior of the camera device holder comprises:
  - activating, using the rotating control signal, a rotating motor of the camera device holder; and
  - activating, using the tilting control signal, a tilting motor of the camera device holder.

* * * * *